United States Patent
Rosa et al.

(10) Patent No.: US 9,421,743 B2
(45) Date of Patent: Aug. 23, 2016

(54) SINGLE POLYMER FILM STRUCTURES FOR USE IN STAND-UP-POUCHES

(75) Inventors: Rosana Rosa, Sao Paulo (BR); Nicolas C. Mazzola, Jundiai (BR); Jorge C. Gomes, Sao Paulo (BR)

(73) Assignee: Dow Global Technologies LLC, Midland, MI (US)

( * ) Notice: Subject to any disclaimer, the term of this patent is extended or adjusted under 35 U.S.C. 154(b) by 34 days.

(21) Appl. No.: 13/805,272

(22) PCT Filed: May 6, 2011

(86) PCT No.: PCT/US2011/035509
§ 371 (c)(1),
(2), (4) Date: Dec. 18, 2012

(87) PCT Pub. No.: WO2012/003042
PCT Pub. Date: Jan. 5, 2012

(65) Prior Publication Data
US 2016/0001533 A1    Jan. 7, 2016

Related U.S. Application Data

(60) Provisional application No. 61/359,017, filed on Jun. 28, 2010.

(51) Int. Cl.
*B32B 27/32* (2006.01)
*B32B 27/08* (2006.01)
*B32B 7/02* (2006.01)

(52) U.S. Cl.
CPC . *B32B 27/32* (2013.01); *B32B 7/02* (2013.01); *B32B 27/08* (2013.01); *B32B 27/327* (2013.01); *B32B 2250/05* (2013.01); *B32B 2250/242* (2013.01); *B32B 2307/31* (2013.01); *B32B 2307/558* (2013.01); *B32B 2307/72* (2013.01); *B32B 2307/7246* (2013.01); *B32B 2439/00* (2013.01); *B32B 2439/40* (2013.01)

(58) Field of Classification Search
USPC ......................................................... 428/220
See application file for complete search history.

(56) References Cited

U.S. PATENT DOCUMENTS 3,645,992 A   2/1972   Dow
3,914,342 A   10/1975  Mitchell (Continued)

FOREIGN PATENT DOCUMENTS

EP    1902837 A1   3/2008
EP    1961557 A1   8/2008

(Continued)

OTHER PUBLICATIONS

PCT/US2011/035509, International Search Report and Written Opinion.

(Continued)

*Primary Examiner* — Tahseen N Khan

(57) ABSTRACT

The present invention relates to film structure suitable for use in stand up pouches comprising all polyethylene material. The film structure can be a monolayer film or a multilayer film structure having specific requirements for each layer. The combination results in a film structure having adequate stiffness to function as a stand-up pouch while also providing acceptable water vapor transmission rates and good tear resistance. Such films have improved sustainability characteristics as they should permit down-gauging of the films and, can more easily be recycled, at least for the preferred embodiment comprising only polyethylene resins.

7 Claims, 1 Drawing Sheet

(56) References Cited

U.S. PATENT DOCUMENTS

| | | |
|---|---|---|
| 4,076,698 A | 2/1978 | Anderson et al. |
| 4,599,392 A | 7/1986 | McKinney et al. |
| 5,272,236 A | 12/1993 | Lai et al. |
| 5,278,272 A | 1/1994 | Lai et al. |
| 5,582,923 A | 12/1996 | Kale et al. |
| 5,733,155 A | 3/1998 | Sagawa et al. |
| 5,854,045 A | 12/1998 | Fang et al. |
| 6,957,915 B2 | 10/2005 | Tankersley |
| 2003/0213938 A1* | 11/2003 | Farley ................ C08L 23/0815 252/500 |
| 2004/0014895 A1* | 1/2004 | Farley .................... C08L 23/06 525/240 |
| 2008/0057238 A1 | 3/2008 | Follestad et al. |

FOREIGN PATENT DOCUMENTS

| | | |
|---|---|---|
| EP | 1961558 A1 | 8/2008 |
| JP | 2001-277408 A | 10/2001 |
| JP | 2002-052669 A | 2/2002 |
| JP | 2003-072003 A | 3/2003 |
| JP | 2006-117287 A | 5/2006 |
| JP | 2009-172846 A | 8/2009 |
| WO | 02/36341 A2 | 5/2002 |
| WO | 2008/037447 A1 | 4/2008 |

OTHER PUBLICATIONS

PCT/US2011/035509, International Preliminary Report on Patentability.

* cited by examiner

SINGLE POLYMER FILM STRUCTURES FOR USE IN STAND-UP-POUCHES

CROSS-REFERENCE TO RELATED APPLICATIONS

This application is a national stage of International Application No. PCT/US11/35509, which is a non-provisional application claiming priority from the U.S. Provisional Patent Application No. 61/359,017 filed Jun. 28, 2010 entitled "SINGLE POLYMER FILM STRUCTURES FOR USE IN STAND-UP-POUCHES."

FIELD OF THE INVENTION

The present invention relates to film structures for use in stand-up pouches. The film structures are made up of only polyethylene type polymers and yet exhibit acceptable, stiffness, toughness, and barrier properties to allow them to be used in stand-up pouches.

BACKGROUND AND SUMMARY OF THE INVENTION

Historically, plastic pouches for food, home or personal care markets were arranged horizontally. However, when these pouches are arranged horizontally, it is difficult for a consumer to determine the contents because the principal display panels are generally concealed. It was therefore desired to develop pouches capable of standing upright for standing on retail shelving so the packaging can be front and center with shoppers and attract the shopper's eyes. Today, such pouches, known as Stand-up Pouches (or "SUPs"), are a common sight throughout the world, and particularly in Asia. These SUPs used for a wide range of end-use applications and also positioned as refill packs for bottles. Different polymers can be used in SUP structures. They can be made to fulfill many demands and requirements In order to function as a standup pouch, the films used to make the pouch must exhibit sufficient stiffness so that the bags may stand without becoming distorted and losing their shape. Further they must exhibit suitable toughness so that they are not easily ruptured. Additionally, they should be capable of being sealed using the common heat seal equipment used in industry. For some applications it is also desirable that the pouches provide a barrier to moisture, light and/or oxygen transmission.

Currently, most of the SUPs in the market are made with polyethylene (PE) film (mono or coex) laminated with another material to provide stiffness or other desired properties. Often this other material is polyethylene terephthalate (PET). There are also other structures where polypropylene and/or aluminum foil and/or polyamides (Nylon) are used. However, there is no Stand-up-Pouch produced with only polyethylene.

Achieving a film capable of use as a stand-up pouch using only polyethylene resin would be desirable for sustainability purposes. In general, the use of polyethylene would allow companies to down-gauge the film while retaining adequate puncture resistance. This would in turn reduce the amount of energy needed for transporting the packaging materials as well as reduce the volume of waste sent to the landfill. Moreover, a film structure comprising a single class of resin, like polyethylene, can more easily be recycled.

Accordingly, in one embodiment the present invention covers a monofilm structure suitable for use in stand up pouches on its own, without lamination to another film. For purposed of the present invention, "monofilm" means films which are produced in a single production step, such as in an extrusion process. As is known in the art, production processes such as extrusion and coextrusion can produce films having one or more layers, which are "monofilms" for the purpose of this disclosure.

The monofilm of the present invention is a coextruded film, comprising at least three layers. The first surface layer (X) comprised from 50 to 100 percent (by weight of the layer (X)) of a linear low density polyethylene having a density from 0.89 to 0.91 g/cm$^3$ and a melt index of less than 1.3 dg/min, and a peak melting point in a range of from 85° C. to 105° C., and a molecular weight distribution, Mw/Mn range of 2.0 to 3.0.

This monofilm further comprises at least one core layer (Y) comprising from 60 to 100 percent (by weight of the layer (Y)) of a first multimodal polyethylene polymer having a multimodal distribution in terms of molecular weight, wherein said first multimodal polyethylene comprises units derived from ethylene and at least one $C_3$-$C_{10}$ alpha-olefin (preferably $C_6$-$C_8$), and wherein the first multimodal polyethylene polymer has a density in the range of 0.950-0.965 g/cm$^3$, a melt index of less than 1.20 dg/min, a peak melting point greater than 120° C., and a molecular weight distribution, $M_w/M_n$ ratio greater than 5.0.

The monofilm of the present invention further comprises a second surface layer (Z) which comprises from 50 to 100 percent (by weight of the layer (Z)) of a second multimodal polyethylene polymer having a multimodal distribution in terms of molecular weight, wherein said second multimodal polyethylene comprises units derived from ethylene and at least one $C_3$-$C_{10}$ alpha-olefin (preferably $C_6$-$C_8$), said second multimodal polyethylene polymer having a density in the range of 0.950-0.965 g/cm$^3$, a melt index of less than 1.20 dg/min, and a peak melting point in the range of from 120° C. to 135° C., and a molecular weight distribution, $M_w/M_n$ ratio greater than 5.0.

The second surface layer (Z) in the monofilm may further comprise from 0 to 50 percent (by weight of the layer (Z)) of a copolymer comprising units derived from ethylene and at least one $C_3$-$C_{10}$ alpha-olefin (preferably $C_6$-$C_8$), and wherein the polyethylene polymer has a density in the range of 0.91- to 0.95 g/cm$^3$, a melt index of less than 1.2 dg/min, a peak melting point greater than 110° C., and a molecular weight distribution, $M_w/M_n$ ratio greater than 3.0. This component can be multimodal or monomodal.

In another embodiment, the present invention is a laminated film structure suitable for use in stand up pouches comprising a first film and at least a second film laminated to the first film. The first film is a coextruded film comprising at least a surface layer (A) comprising from 70 to 100 percent (by weight of the layer (A)) of a linear low density polyethylene having a density from 0.89 to 0.91 g/cm$^3$ and a melt index of less than 1.3 dg/min, and a peak melting point in a range of from 85° C. to 105° C., and a molecular weight distribution, Mw/Mn range of 2.0 to 3.0. The first film also comprises at least one additional layer (B) comprising from 70 to 100 percent (by weight of the layer (B)) of a first multimodal polyethylene polymer having a multimodal distribution in terms of molecular weight, wherein said first multimodal polyethylene comprises units derived from ethylene and at least one $C_3$-$C_{10}$ alpha-olefin (preferably $C_6$-$C_8$), and wherein the first multimodal polyethylene polymer has a density in the range of 0.950-0.965 g/cm3, a melt index of less than 1.20 dg/min, a peak melting point greater than 120° C., and a molecular weight distribution, Mw/Mn ratio greater than 5.0.

The second film, which is laminated to the first film in order to form the film structure, is also a coextruded film, but comprises at least three layers. The first surface layer (C) comprises from 60 to 100 percent (by weight of the layer (C)) of a second multimodal polyethylene polymer having a multimodal distribution in terms of molecular weight, wherein said second multimodal polyethylene comprises units derived from ethylene and at least one $C_3$-$C_{10}$ alpha-olefin (preferably $C_6$-$C_8$), and wherein the second multimodal polyethylene polymer has a density in the range of 0.91- to 0.93 g/cm$^3$, a melt index of less than 1.2 dg/min, a peak melting point greater than 110° C., and a molecular weight distribution, Mw/Mn ratio in the range of from 3.0 to 4.0. The second film also comprises at least one core layer (D) comprising from 70 to 100 percent (by weight of the layer (D)) of a third multimodal polyethylene polymer having a multimodal distribution in terms of molecular weight, wherein said third multimodal polyethylene comprises units derived from ethylene and at least one $C_3$-$C_{10}$ alpha-olefin (preferably $C_6$-$C_8$), said third multimodal polyethylene polymer having a density in the range of 0.950-0.965 g/cm$^3$, a melt index of less than 1.20 dg/min, and a peak melting point in the range of from 120° C. to 135° C., and a molecular weight distribution, Mw/Mn ratio greater than 5.0.

The second film also comprises a second surface layer (E) comprising from 60 to 100 percent (by weight of the layer (E)) of a copolymer comprising units derived from ethylene and at least one alpha-olefin in the range of $C_3$-$C_{10}$ (preferably $C_6$-$C_8$), wherein said copolymer has a density from 0.91 to 0.93 g/cm$^3$, a melt index of less than 1.2 dg/min, a peak melting point greater than 110° C. and a molecular weight distribution, Mw/Mn ratio in the range of from 3.0 to 4.5.

The first film and the second film are laminated in such a manner so that the additional layer (B) of the first film is adjacent to the first surface layer (C) of the second film. While other materials than those recited may be blended with the recited materials to form the individual layers, the laminated film structures of the present invention can be characterized it by having no, or substantially no polymer materials which are not characterized as polyethylene homopolymers or copolymers.

DETAILED DESCRIPTION OF THE INVENTION

Figure 1:
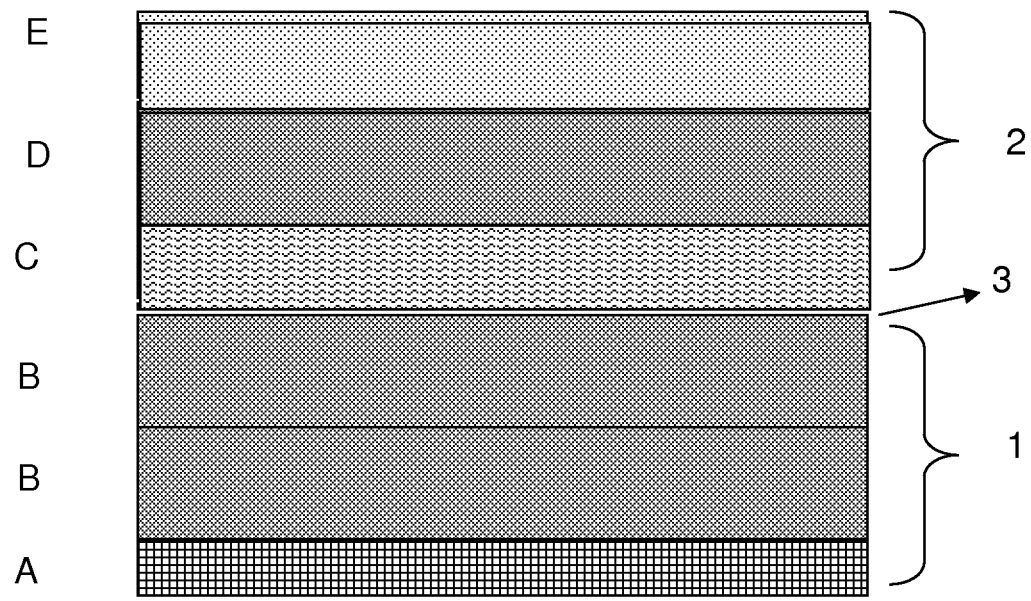
FIG. 1 is a side-view of a laminated film structure of the present invention.

The term "polymer", as used herein, refers to a polymeric compound prepared by polymerizing monomers, whether of the same or a different type. The generic term polymer thus embraces the term "homopolymer", usually employed to refer to polymers prepared from only one type of monomer as well as "copolymer" which refers to polymers prepared from two or more different monomers.

"Polyethylene" shall mean polymers comprising greater than 50% by weight of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single site catalyzed Linear Low Density Polyethylene, including both linear and substantially linear low density resins (m-LLDPE); and High Density Polyethylene (HDPE). These polyethylene materials are generally known in the art; however the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, herein incorporated by reference). LDPE resins typically have a density in the range of 0.916 to 0.940 g/cm$^3$.

The term "LLDPE", includes both resin made using the traditional Ziegler-Natta catalyst systems as well as single-site catalysts such as metallocenes (sometimes referred to as "m-LLDPE") and includes linear, substantially linear or heterogeneous polyethylene copolymers or homopolymers. LLDPEs contain less long chain branching than LDPEs and includes the substantially linear ethylene polymers which are further defined in U.S. Pat. No. 5,272,236, U.S. Pat. No. 5,278,272, U.S. Pat. No. 5,582,923 and U.S. Pat. No. 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or U.S. Pat. No. 5,854,045). The Linear PE can be made via gas-phase, solution-phase or slurry polymerization or any combination thereof, using any type of reactor or reactor configuration known in the art, with gas and slurry phase reactors being most preferred.

The term "HDPE" refers to polyethylenes having densities greater than about 0.940 g/cm3, which are generally prepared with Ziegler-Natta catalysts, chrome catalysts or even metallocene catalysts.

"Multimodal" means resin compositions which can be characterized by having at least two distinct peaks in a GPC chromatogram showing the molecular weight distribution. Multimodal includes resins having two peaks as well as resins having more than two peaks.

The following analytical methods are used in the present invention:

Density is determined in accordance with ASTM D792.

"Melt index" also referred to as "$I_2$" is determined according to ASTM D1238 (190° C., 2.16 kg).

Peak melting point is determined by Differential Scanning calorimeter (DSC) where the film is conditioned at 230° C. for 3 minutes prior to cooling at a rate of 10° C. per minute to a temperature of −40° C. After the film is kept at −40° C. for 3 minutes, the film is heated to 200° C. at a rate of 10° C. per minute.

The term molecular weight distribution or "MWD" is defined as the ratio of weight average molecular weight to number average molecular weight ($M_w/M_n$). $M_w$ and $M_n$ are determined according to methods known in the art using conventional gel permeation chromatography (conventional GPC).

Water Vapor Transmission Rate (or WVTR) is determined according to ASTM E 96/E 96 M-05.

2% Secant Modulus-MD (machine direction) and CD (cross direction): ASTM D882-10 (average of five film samples in each direction; each sample "1 in×6 in").

MD and CD Elmendorf Tear Strength: ASTM D1922-09 (average of 15 film samples in each direction; each sample "3 in×2.5 in" half moon shape).

MD and CD Tensile Strength: ASTM D882-10 (average of five film samples in each direction; each sample "1 in×6 in").

Dart Impact Strength: ASTM D1709-09 (minimum of 20 drops to achieve a 50% failure; typically ten "10 in×36 in" strips).

Puncture Strength: Puncture was measured on an INSTRON Model 4201 with SINTECH TESTWORKS SOFTWARE Version 3.10. The specimen size was "6 in×6 in," and four measurements were made to determine an average puncture value. The film was conditioned for 40 hours after film production, and at least 24 hours in an ASTM controlled laboratory (23° C. and 50% relative humidity). A "100 lb" load cell was used with a round specimen holder of 4 inch diameter. The puncture probe is a "½ inch diameter" polished stainless steel ball (on a 2.5" rod) with a "7.5 inch maximum travel length."

There was no gauge length, and the probe was as close as possible to, but not touching, the specimen (the probe was set by raising the probe until it touched the specimen). Then the probe was gradually lowered, until it was not touching the specimen. Then the crosshead was set at zero. Considering the maximum travel distance, the distance would be approximately 0.10 inch. The crosshead speed was 10 inches/minute. The thickness was measured in the middle of the specimen. The thickness of the film, the distance the crosshead traveled, and the peak load were used to determine the puncture by the software. The puncture probe was cleaned using a "KIM-WIPE" after each specimen.

In a first embodiment, the film structure of the present invention is a structure suitable for use in stand up pouches on its own, without lamination to another film. The monofilm of the present invention is a coextruded film, comprising at least three layers. The first surface layer (X) comprised from 50 to 100 percent (by weight of the layer (X)) of a linear low density polyethylene having a density from 0.89 to 0.91 g/cm$^3$ and a melt index of less than 1.3 dg/min, and a peak melting point in a range of from 85° C. to 105° C., and a molecular weight distribution, Mw/Mn range of 2.0 to 3.0.

This monofilm further comprises at least one core layer (Y) comprising from 60 to 100 percent (by weight of the layer (Y)) of a first multimodal polyethylene polymer having a multimodal distribution in terms of molecular weight, wherein said first multimodal polyethylene comprises units derived from ethylene and at least one $C_3$-$C_{10}$ alpha-olefin (preferably $C_6$-$C_8$), and wherein the first multimodal polyethylene polymer has a density in the range of 0.950-0.965 g/cm$^3$, a melt index of less than 1.20 dg/min, a peak melting point greater than 120° C., and a molecular weight distribution, $M_w/M_n$ ratio greater than 5.0.

The monofilm of the present invention further comprises a second surface layer (Z) which comprises from 50 to 100 percent (by weight of the layer (Z)) of a second multimodal polyethylene polymer having a multimodal distribution in terms of molecular weight, wherein said second multimodal polyethylene comprises units derived from ethylene and at least one $C_3$-$C_{10}$ alpha-olefin (preferably $C_6$-$C_8$), said second multimodal polyethylene polymer having a density in the range of 0.950-0.965 g/cm$^3$, a melt index of less than 1.20 dg/min, and a peak melting point in the range of from 120° C. to 135° C., and a molecular weight distribution, $M_w/M_n$ ratio greater than 5.0.

The second surface layer (Z) in the monofilm may further comprise from 0 to 50 percent (by weight of the layer (Z)) of a copolymer comprising units derived from ethylene and at least one $C_3$-$C_{10}$ alpha-olefin (preferably $C_6$-$C_8$), and wherein polyethylene polymer has a density in the range of 0.91- to 0.95 g/cm$^3$, a melt index of less than 1.2 dg/min, a peak melting point greater than 110° C., and a molecular weight distribution, $M_w/M_n$ ratio greater than 3.0.

In another embodiment, the film structures of the present invention comprise at least two multi-layer coextruded films laminated together.

The first film in such embodiments is a coextruded film comprising at least two layers. At least one layer ("layer (A)") is surface layer which will provide sealability for the over all film structure. Accordingly the surface layer (A) will comprise from 70 to 100 percent (by weight of the layer (A)), preferably at least 80, 90 or even 100 percent of a linear low density polyethylene having a density from 0.89 to 0.91 g/cm$^3$, preferably from 0.895 to 0.905 g/cm$^3$, and a melt index range of 0.7 to 1.3 dg/min, preferably 0.8 to 1.2 dg/min, more preferably 0.9 to 1.1 dg/min, and a peak melting point range of 85° C. to 105° C., preferably 90° C. to 100° C., and a molecular weight distribution, Mw/Mn range of 2.0 to 3.0. Two or more different resins, which each fall within the description set forth in this paragraph, may be used in this invention. In such a case, the total amount of such resins should be 70 to 100 percent by weight of layer (A). While it is preferred that such resins make up 100 percent of layer (A), other resins may be added, however it is preferred that such resins also be polyethylene material. It is preferred that the resin used for layer A be such that layer (A) will have a heat seal strength of at least 25 N/25 mm, more preferably at least 30 still more preferably at least 35 N/25 mm at 90° C. It is also preferred that layer (A) have a thickness in the range of 5 to 15 microns, preferably in the range of from 10 to 15 microns. The first coextruded film for use in the present invention also comprises at least one additional layer ("layer (B)") comprising from 70 to 100 percent (by weight of the layer (B)), preferably at least 80, 90 or even 100 percent of a first multimodal polyethylene polymer having a multimodal distribution in terms of molecular weight, wherein said first multimodal polyethylene comprises units derived from ethylene and at least one $C_3$-$C_{10}$ alpha-olefin (preferably $C_6$-$C_8$), and wherein the first multimodal polyethylene polymer has a density in the range of 0.950-0.965 g/cm$^3$, preferably 0.955 to 0.962 g·cm$^3$ range a melt index range of 0.8 to 1.2, preferably 0.9 to 1.1 dg/min a peak melting point range of 120 to 135, preferably 125 to 132° C. as measured by a differential scanning calorimeter and a molecular weight distribution, Mw/Mn ratio greater than 5.0, preferably greater than 6.0. Two or more different resins, which each fall within the description set forth in this paragraph, may be used in this invention. In such a case, the total amount of such resins should be 70 to 100 percent by weight of layer (B). While it is preferred that such resin make up 100 percent of layer (B), other resins may be added, however it is preferred that such resins also be polyethylene material. It is also preferred that layer B have a thickness range of 40 to 60 microns, preferably 45 to 55 microns The films of the present invention (whether a monofilm structure or the first or second film in a multi film structure) may comprise additional layers so long as they do not interfere with the overall performance of the film. It is preferred that any such additional layer also comprise only polyethylene material. It is also contemplated that in the process of extruding a film, the same resin may be used in two or more layers in an extruder, particularly extruders designed for more than two layers. Thus for example in a three layer extruder, sometimes referred to as A/B/C, the resin described for layer A may advantageously be used in the first or "A" layer and the resin described for layer B may be used in both the second and third layers (i.e. the "B" and "C" layers), thus in effect making a two layer coextruded film.

In some embodiments, the film structure of the present invention also comprises a second coextruded film. The second coextruded film comprises at least 3 different layers. The first such layer is a first surface layer (C) comprising from 60 to 100 percent (by weight of the layer (C)), preferably at least 70, 80, 90 or even 100 percent of a second multimodal polyethylene polymer having a multimodal distribution in terms of molecular weight, wherein said second multimodal polyethylene comprises units derived from ethylene and at least one $C_3$-$C_{10}$ alpha-olefin (preferably $C_6$-$C_8$), and wherein the second multimodal polyethylene polymer has a density in the range of 0.910 to 0.930 g/cm$^3$, preferably 0.915-0.920 g/cm$^3$ a melt index range of 0.8 to 1.2, preferably 0.9 to 1.1 dg/min a peak melting point range of 110 to 130, preferably 115 to 125° C. and a molecular weight distribution, Mw/Mn ratio on the range of from 3.0 to 4.0. Two or more different resins, which each fall within the description set forth in this paragraph, may be used in this invention. In such a case, the total amount of such resins should be 70 to 100 percent by weight of layer (C). While it is preferred that such resin make up 100 percent of layer (C), other resins may be added, however it is preferred that such resins also be polyethylene material. It is also preferred that layer C have a thickness range of 10 to 25, preferably from 15 to 20 microns. The second coextruded film also comprises at least one core layer (D) comprising from 70 to 100 percent (by weight of the layer (D)), preferably at least 80, 90 or even 100 percent of a third multimodal polyethylene polymer having a multimodal distribution in terms of molecular weight, wherein said third multimodal polyethylene comprises units derived from ethylene and at least one $C_3$-$C_{10}$ alpha-olefin (preferably $C_6$-$C_8$), said third multimodal polyethylene polymer having a density in the range of 0.950-0.965 g/cm$^3$, preferably 0.955 to 0.962 g/cm$^3$, a melt index range of 0.8 to 1.2, preferably 0.9 to 1.1 dg/min a peak melting point range of 120° C. to 135° C., preferably 125° C. to 135° C. as measured by a differential scanning calorimeter and a molecular weight distribution, Mw/Mn ratio greater than 5.0, preferably greater than 6.0. It should be noted that the first and third multimodal resin can be identical. Two or more different resins, which each fall within the description set forth in this paragraph, may be used in this invention. In such a case, the total amount of such resins should be 70 to 100 percent by weight of layer (D). While it is preferred that such resin make up 100 percent of layer (D), other resins may be added, however it is preferred that such resins also be polyethylene material. It is also preferred that layer D have a thickness range of 15 to 35, preferably 20 to 30 microns.

The second coextruded film of the present invention also comprises a second surface layer (E) comprising from 60 to 100 percent (by weight of the layer (E)), preferably at least 70, 80, 90 or even 100 percent of a copolymer comprising units derived from ethylene and at least one alpha-olefin in the range of $C_3$-$C_{10}$ (preferably $C_6$-$C_8$), wherein said copolymer has a density from 0.91 to 0.93 g/cm$^3$, preferably 0.915 to 0.925 g/cm3, a melt index range of 0.8 to 1.2, preferably 0.9 to 1.1 dg/min, a peak melting point range of 110° C. to 130° C., preferably 115° C. to 123° C. and a molecular weight distribution, Mw/Mn ratio in the range of from 3.0 to 4.5. Two or more different resins, which each fall within the description set forth in this paragraph, may be used in this invention. In such a case, the total amount of such resins should be 60 to 100 percent by weight of layer (E). While it is preferred that such resin make up 100 percent of layer (E), other resins may be added, however it is preferred that such resins also be polyethylene material. It is also preferred that layer E have a thickness range of 10 to 30, more preferably from 15 to 25 microns.

The second film of the present invention may comprise additional layers so long as they do not interfere with the overall performance of the film. It is preferred that any such additional layer also comprise only polyethylene material. It is also contemplated that in the process of extruding a film, the same resin may be used in two or more layers in an extruder, particularly extruders designed for more than three layers. Thus for example in a five layer extruder, sometimes referred to as A/B/C/D/E, the resin described for layer C may advantageously be in the first or "A" layer and the resin described for layer D may be used in each of the second, third and fourth layers (i.e. the "B", "C" and "D" layers), with the resin described for resin E being used in the fifth layer of the extruder.

In the multi-film structure of the present invention, the first film is laminated to the second film such that the additional layer (B) of the first film is adjacent to the first surface layer (C) of the second film. The lamination of the film can be performed by any method known in the art. A preferred method uses solvent based or solventless polyurethane adhesive systems, as offered by Henkel GmbH under the LIOFOL® trademark.

The overall laminated film structure and the monofilm structure of the present invention are characterized by the substantial absence of polymers other than polyethylene homopolymers and copolymers. By "substantial absence" it is meant that less than 1% of the film structure will comprise resins other than polyethylene, preferably less than 0.5%. Most preferably there will be no resins other than polyethylene in the film structure.

Each of the resins used in the present invention may contain additives as is generally know in the art. Additives such as antioxidants (e.g., hindered phenolics such as Irganox® 1010 or Irganox® 1076 supplied by Ciba Geigy), phosphites (e.g., Irgafos 168 also supplied by Ciba Geigy), cling additives (e.g., PIB), Standostab PEPQ™ (supplied by Sandoz), pigments, colorants, fillers, and the like can also be included in the ethylene polymer extrusion composition of the present invention at levels typically used in the art to achieve their desired purpose.

In general, it is preferred that each film be about 40 to 70, preferably from 55 to 65 microns in thickness such that the total laminated film structure is 140 microns, preferably 130, 120, 100 microns or less.

It is also preferred that the first film for use in the present invention have a water vapor transmission rate (WVTR) of less than 2.5 g·60 μm/m$^2$·day based on ASTM E 96/E 96 M-05 and a dart impact of 140 g or more based on ASTM D 1709 method A.

Similarly, it is preferred that the second film for use in the present invention have a WVTR of less than 3.5 g·60 μm/m$^2$ day based on ASTM E 96/E 96 M-05 and a dart impact of 245 g or more based on ASTM D 1709 method A.

It is preferred that the laminated film structure has a WVTR of less than 1.5 g·120 μm/m$^2$·day based on ASTM E 96/E 96 M-05 and a dart impact of 300 g or more based on ASTM D 1709 method A.

Figure 2:
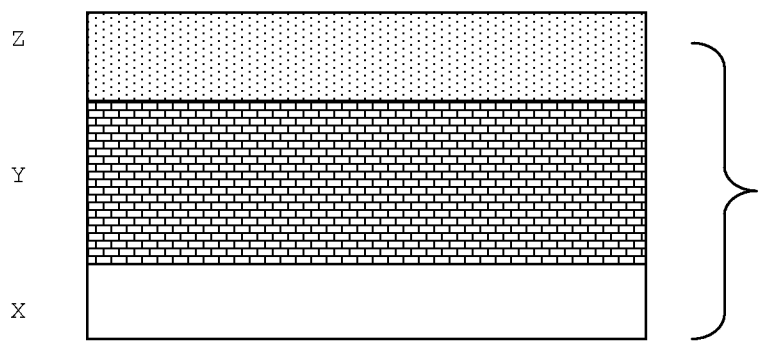
FIG. 2 is a side-view of a monofilm structure of the present invention.

A schematic of a laminated film according to the present invention is shown in FIG. 1 (where the numeral "1" designates the first film layer, and numeral "2" designates the second film layer and numeral "3" indicates the adhesive layer) and a schematic of a monofilm is shown in FIG. 2.

EXPERIMENTAL

The films used to produce both laminated and monofilm structures for single polymer stand up pouches were produced using standard co-extrusion machines for polyethylene, but each film used a different process condition in order to optimize film aesthetics (gloss and haze) and deliver stable production.

The following resins were used in the Examples

Resin A is a monomodal linear low density polyethylene having a melt index ($I_2$) of 1.00 g/10 min, and a density of 0.900 g/cm$^3$, a peak melting point of 90° C., and a molecular weight distribution (Mw/Mn) of 2.5.

Resin B is a multimodal polyethylene polymer derived from ethylene and 1-octene, having an overall density of 0.962 g/cm$^3$, a melt index ($I_2$) of 0.85 g/10 min, a peak melting point of 134° C., and a molecular weight distribution (Mw/Mn) of 5.5.

Resin C is a multimodal polyethylene polymer derived from ethylene and 1-octene, having an overall density of 0.9175 g/cm$^3$, a melt index ($I_2$) of 1.00 g/10 min, a peak melting point of 123° C., and a molecular weight distribution (Mw/Mn) of 3.4.

Resin D is a multimodal polyethylene polymer derived from ethylene and 1-octene, having an overall density of 0.962 g/cm$^3$, a melt index ($I_2$) of 0.85 g/10 min, a peak melting point of 134° C., and a molecular weight distribution (Mw/Mn) of 5.5.

Resin E is a monomodal linear low density polyethylene having a melt index ($I_2$) of 1.00 g/10 min, and a density of 0.926 g/cm$^3$, a peak melting point of 125° C., and a molecular weight distribution (Mw/Mn) of 3.8.

Resin F is a monomodal linear low density polyethylene having a melt index ($I_2$) of 1.00 g/10 min, and a density of 0.904 g/cm$^3$, a peak melting point of 99° C., and a molecular weight distribution (Mw/Mn) of 2.5.

Resin G is a monomodal polyethylene polymer derived from ethylene and 1-octene, having an overall density of 0.950 g/cm$^3$, a melt index ($I_2$) of 0.95 g/10 min, a peak melting point of 133° C., and a molecular weight distribution (Mw/Mn) of 3.4. The laminated film is composed by two coextruded films (3 layers) using the following structure:

Film 1: 60 microns
Layer A (20% by weight of Film 1): 100% Resin A
Layer B (40% by weight of Film 1): 100% Resin B
Layer B (40% by weight of film 1): 100% Resin B
Film 2: 60 microns
Layer C (30% by weight of Film 2): 100% Resin C
Layer D (40% by weight of Film 2): 100% Resin D
Layer E (30% by weight of Film 2): 100% Resin E The process conditions for each film are described below:
Film 1 A/B/B (20/40/40)
Output: 100 kg/hr
BUR: 1.3
Die gap: 1.8 mm
Die diameter: 200 mm
Melt Temperature: 240° C.
Pressure: 160 Bar
Amps: 42 A
Speed (rpm): 540
Profile temperature: Zone 1 (200° C.) to Zone 7 (240° C.)
Film 2 C/D/E (30/40/30)
Output: 100 kg/hr
BUR: 1:3
Die gap: 1.8 mm
Die diameter: 8 in
Melt Temperature: 240° C.
Pressure: 167 Bar
Amps: 42 A
Speed (rpm): 481
Profile temperature: Zone 1 (180° C.) to Zone 7 (200° C.)

The film layers were laminated together using standard lamination machines with a thin layer (less than 1 g/m2) of LIOFOL® solventless polyurethane adhesive.

Mechanical properties of the final laminated films were measured and the results are shown at Table 1.

TABLE 1

Mechanical properties of laminated film for single polymer stand-up pouches

| Test | Results | Unit | |
|---|---|---|---|
| Thickness | Average Thickness | um | 120 |
| Elmendorf Tear - CD | Average Elmendorf | g | 1159 |
| Elmendorf Tear - MD | Average Elmendorf | g | 355 |
| Puncture Resistance | Energy to Break | J | 5.53 |
|  | Puncture | J/cm3 | 5.54 |
| Secant Modulus - 2% DM | Average Secant Modulus | — | 421 |
| Secant Modulus - 2% DT | Average Secant Modulus | — | 510 |
| Tensile - CD | Average Elongation at Break | % | 980 |
|  | Average Load at Break | MPa | 28.2 |
|  | Average Yield Stress | MPa | 21 |
| Tensile - MD | Average Elongation at Break | % | 998 |
|  | Average Load at Break | MPa | 36.7 |
|  | Average Yield Stress | MPa | 18.5 |
| Dart Drop Test (Type A) |  |  | 315 |

Monolfilm structures were also successfully tried to be used as single polymer stand-up pouches. The film used a coextrusion machine to produce three layers PE films composed by:

Monofilm (A/B/C): 134 microns
Layer X (20% by weight): 100% Resin F
Layer Y (40% by weight): 100% Resin B
Layer Z (40% by weight): 100% Resin G The process conditions for each film are described below:
Output: 150 kg/hr
BUR: 2.0
Die gap: 1.8 mm
Die diameter: 200 mm
Melt Temperature: 240° C.
Profile temperature: Zone 1 (200° C.) to Zone 7 (240° C.)

Table 2 shows the film properties obtained using the described formulation. Comparing the Monofilm structure with the Laminated structure it can be noted that the secant modulus at 2% of Monofilm structure is higher and consequently the puncture resistance dropped. This results are expected and depending on the each application requirements—higher mofulus and/or higher stiffness—different structures can be used within the ranges described in this invention.

TABLE 2

Mechanical properties of monolayer film for single polymer stand-up pouches

| Test | Results | Unit | |
|---|---|---|---|
| Thickness | Average Thickness | um | 134 |
| Elmendorf Tear - CD | Average Elmendorf | g | 599 |
| Elmendorf Tear - MD | Average Elmendorf | g | 253 |
| Puncture Resistance | Energy to Break | J | 1.48 |
| | Puncture | J/cm3 | 1.35 |
| Secant Modulus - 2% DM | Average Secant Modulus | — | 516 |
| Secant Modulus - 2% DT | Average Secant Modulus | — | 614 |
| Tensile - CD | Average Elongation at Break | % | 668 |
| | Average Load at Break | MPa | 25.1 |
| | Average Yield Stress | MPa | 25.1 |
| Tensile - MD | Ave Elongation at Break | % | 967 |
| | Average Load at Break | MPa | 27.6 |
| | Average Yield Stress | MPa | 22.6 |

What is claimed is:

1. A laminated film structure suitable for use in stand up pouches comprising:

a) a first film comprising:

i) at least one surface layer (A) comprising from 70 to 100 percent by weight of the layer (A) of a linear low density polyethylene having a density from 0.89 to 0.91 g/cm$^3$ and a melt index of less than 1.3 dg/min, and a peak melting point in the range of from 85° C. to 100° C., and a molecular weight distribution, Mw/Mn, in the range of from 2.0 to 3.0; and ii) at least one additional layer (B) comprising from 70 to 100 percent by weight of the layer (B) of a first multimodal polyethylene polymer having a multimodal distribution in terms of molecular weight, wherein said first multimodal polyethylene comprises units derived from ethylene and at least one $C_3$-$C_{10}$ alpha-olefin, and wherein the first multimodal polyethylene polymer has a density in the range of from 0.950 to 0.965 g/cm$^3$, a melt index in the range of from 0.8 to 1.2 dg/min, a peak melting point in the range of from 120° C. to 135° C. as measured by a differential scanning calorimeter, and a molecular weight distribution, Mw/Mn ratio greater than 5.0;

b) at least a second film comprising:

i) a first surface layer (C) comprising from 60 to 100 percent by weight of the layer (C) of a second multimodal polyethylene polymer having a multimodal distribution in terms of molecular weight, wherein said second multimodal polyethylene comprises units derived from ethylene and at least one $C_3$-$C_{10}$ alpha-olefin, and wherein the second multimodal polyethylene polymer has a density in the range of from 0.910 to 0.930 g/cm$^3$, a melt index in the range of from 0.8 to 1.2 dg/min, a peak melting point in the range of from 110° C. to 130° C., and a molecular weight distribution, Mw/Mn ratio in the range of from 3.0 to 4.0;

ii) at least one core layer (D) comprising from 70 to 100 percent by weight of the layer (D) of a third multimodal polyethylene polymer having a multimodal distribution in terms of molecular weight, wherein said first multimodal polyethylene comprises units derived from ethylene and at least one $C_3$-$C_{10}$ alpha-olefin, and wherein the first multimodal polyethylene polymer has a density in the range of from 0.950 to 0.965 g/cm$^3$, a melt index in the range of from 0.8 to 1.2 dg/min, a peak melting point in the range of from 120° C. to 135° C. as measured by a differential scanning calorimeter, and a molecular weight distribution, Mw/Mn ratio greater than 5.0; and iii) a second surface layer (E) comprising from 60 to 100 percent by weight of the layer (E) of a copolymer comprising units derived from ethylene and at least one alpha-olefin in the range of $C_3$-$C_{10}$ wherein said copolymer has a density from 0.91 to 0.93 g/cm$^3$, a melt index in the range of from 0.8 to 1.2 dg/min, a peak melting point in the range of from 110° C. to 130° C. and a molecular weight distribution, Mw/Mn ratio in the range of from 3.0 to 4.5;

wherein the first film is laminated to the second film such that the additional layer (B) of the first film is adjacent to the first surface layer (C) of the second film; and wherein the laminated film structure is characterized by the substantial absence of polymers other than polyethylene homopolymers and copolymers.

2. The laminated film structure of claim 1 wherein the surface layer (A) is further characterized as having a heat seal strength of at least 34 N/25 mm at 90° C.

3. The laminated film structure of claim 1 wherein the first multimodal polyethylene and the third multimodal polyethylene are the same material.

4. The laminated film structure of claim 1 wherein the first film has a thickness of 60 microns or less and is characterized by having a water vapor transmission rate (WVTR) of less than 2.5 g·60 μm/m$^2$·day based on ASTM E 96/E 96 M-05 and a dart impact of 140 g or more, based on ASTM D 1709 method A.

5. The laminated film structure of claim 1 wherein the second film has a thickness of 60 microns or less, and is characterized by having a WVTR of less than 3.5 g·60 μm/m$^2$·day based on ASTM E 96/E 96 M-05 and a dart impact of 245 g or more, based on ASTM D 1709 method A.

6. The laminated film structure of claim 1 wherein the overall film structure has a thickness of 120 microns or less and is characterized by having a WVTR of less than 1.5 g·120 μm/m$^2$·day based on ASTM E 96/E 96 M-05 and a dart impact of 300 g or more, based on ASTM D 1709 method A.

7. The laminated film structure of claim 1 wherein the surface layer (A) of the first film has a thickness range of from 10 to 15 microns.

* * * * *